US012570281B2

(12) United States Patent
Bai et al.

(10) Patent No.: US 12,570,281 B2
(45) Date of Patent: Mar. 10, 2026

(54) METHOD FOR EVALUATING DRIVING RISK LEVEL IN TUNNEL BASED ON VEHICLE BUS DATA AND SYSTEM THEREFOR

(71) Applicants: ZheJiang University ZhongYuan Institute, Zhengzhou (CN); Zhejiang University, Hangzhou (CN)

(72) Inventors: Congcong Bai, Zhengzhou (CN); Sheng Jin, Zhengzhou (CN); Chengcheng Yang, Zhengzhou (CN); Saijun Zhong, Zhengzhou (CN); Mengtao Zhou, Zhengzhou (CN); Yang Jiang, Zhengzhou (CN)

(73) Assignees: ZheJiang University ZhongYuan Institute, Zhengzhou (CN); Zhejiang University, Hangzhou (CN)

( * ) Notice: Subject to any disclaimer, the term of this patent is extended or adjusted under 35 U.S.C. 154(b) by 0 days.

(21) Appl. No.: 19/223,082

(22) Filed: May 30, 2025

(65) Prior Publication Data

US 2025/0376157 A1 Dec. 11, 2025

(30) Foreign Application Priority Data

Jun. 5, 2024 (CN) .......................... 202410719441.0

(51) Int. Cl.
*B60W 30/095* (2012.01)
*B60W 50/00* (2006.01)
(Continued)

(52) U.S. Cl.
CPC ...... *B60W 30/095* (2013.01); *B60W 50/0097* (2013.01); *G06N 7/01* (2023.01);
(Continued)

(58) Field of Classification Search
CPC . B60W 30/095; B60W 2540/10; G06N 20/00
See application file for complete search history.

(56) References Cited

U.S. PATENT DOCUMENTS

2018/0022327 A1* 1/2018 Kitagawa ............... G06V 20/56
180/275
2025/0304071 A1* 10/2025 Chen ...................... G06N 3/084

FOREIGN PATENT DOCUMENTS

CN 117334047 A 1/2024
CN 117523317 A 2/2024

OTHER PUBLICATIONS

Chen, Zhijun, et al. "Understanding individualization driving states via latent Dirichlet allocation model." IEEE Intelligent Transportation Systems Magazine 11.2 (2019): 41-53. (Year: 2019).*

(Continued)

*Primary Examiner* — Kevin W Figueroa

(74) *Attorney, Agent, or Firm* — Bayramoglu Law Offices LLC

(57) ABSTRACT

A method for evaluating a driving risk level in a tunnel based on vehicle bus data and a system therefor are provided. The method uses the Controller Area Network (CAN) bus data collected in a vehicle driving process, designs and extracts a driving risk characteristic feature index reflecting the driving behavior of a driver through a sliding time window method, writes a feature codebook to symbolize an extracted sequence feature, and then randomly samples all of the samples, and based on the sampled symbolic data, using a Latent Dirichlet Allocation (LDA) theme model to evaluate the driving risk level. The training method of the model is to acquire the optimal number of risk levels by evaluating the perplexity and the coherence scores, and to analyze the driving risk of the driving data in all of the samples.

13 Claims, 13 Drawing Sheets

(51) Int. Cl.
*G06N 7/01* (2023.01)
*G06N 20/00* (2019.01)

(52) U.S. Cl.
CPC ......... *G06N 20/00* (2019.01); *B60W 2540/10*
(2013.01); *B60W 2540/12* (2013.01); *B60W*
*2540/18* (2013.01)

(56) References Cited

OTHER PUBLICATIONS

Ghandour, Raymond, et al. "A method of vehicle dynamics prediction to anticipate the risk of future accidents: Experimental validation." 2011 14th International IEEE Conference on Intelligent Transportation Systems (ITSC). IEEE, 2011. (Year: 2011).*

Seo, Hyunwoo, et al. "Driving risk assessment using non-negative matrix factorization with driving behavior records." IEEE Transactions on Intelligent Transportation Systems 23.11 (2022): 20398-20412. (Year: 2022).*

Liu Yuxiang, Research on the Lane-Changing Style Classification Method Based on Driving Behavior Primitives, Master of Engineering, Jilin University China 2023, pp. 1-87.

* cited by examiner

Steering wheel angle

Steering wheel angle

Steering wheel angle

Steering wheel angle change rate

Steering wheel angle change rate

Steering wheel angle change rate

Accelerator pedal position

Accelerator pedal position

Brake pedal position

Brake pedal position

Brake pedal position

Brake pedal position

Brake pedal position change rate

Brake pedal position change rate

Brake pedal position change rate

METHOD FOR EVALUATING DRIVING RISK LEVEL IN TUNNEL BASED ON VEHICLE BUS DATA AND SYSTEM THEREFOR

CROSS-REFERENCE TO THE RELATED APPLICATIONS

This application is based upon and claims priority to Chinese Patent Application No. 202410719441.0, filed on Jun. 5, 2024, the entire contents of which are incorporated herein by reference.

TECHNICAL FIELD

The present disclosure belongs to the technical field of tunnel traffic safety research, and relates to a method for evaluating a driving risk level in a tunnel and a system therefor, in particular to a method for evaluating a driving risk level in a tunnel based on vehicle bus data and a system therefor.

BACKGROUND

Real-time evaluation and short-term early warning of a driving risk are very important for actively intervening in traffic and strengthening road safety. Many research reports point out that about 90% of light vehicle collisions involve the same types of human errors, such as damaged state, unintentional errors and dangerous driving behaviors. If accidents cannot be identified quickly, drivers and passengers will be in great danger, and tunnel sections are the key sections with frequent accidents. On the one hand, real-time evaluation and early warning of the driving risk in a tunnel can remind drivers in time, thus avoiding accidents in the tunnel. At the same time, real-time evaluation and early warning can also improve the efficiency of the medical response and greatly reduce the number of deaths. In addition, handling accidents in time can also reduce delays and traffic congestion, which is conducive to tunnel traffic. Therefore, it is necessary to improve an advanced driving assistance system through a more efficient method for evaluating a driving risk, so as to improve the traffic safety level in the tunnel.

In the past, the driving risk level was mainly analyzed based on manual evaluation or a set specific threshold. However, the manual evaluation often takes a lot of time and energy, while the set specific threshold has strong subjectivity and no unified standard, so as to be not flexible and accurate enough. At present, there are some researches on risk level analysis based on driving behavior data, most of which classify different behaviors based on the simple clustering technology. However, it is often difficult for the clustering algorithm to deal with high-dimensional data, and it is necessary to further combine the clustering algorithm with the dimensionality reduction algorithm or extract some new indexes reflecting the driving risk level. Such transformation often reduces the understanding of the model to the original driving data, and it is difficult to discover the potential information of the data. Therefore, using a semantic model to study the driving risk can realize the driving risk definition more in line with the actual scene from the perspective of the intention of a driver.

SUMMARY

In view of the above problems, the present disclosure provides a method for evaluating a driving risk level in a tunnel based on vehicle bus data and a system therefor.

The technical scheme used by the present disclosure is as follows.

A method for evaluating a driving risk level in a tunnel based on vehicle bus data is provided, including the following steps:

step S1, acquiring bus data in a vehicle driving process in a tunnel, and extracting driving risk characteristic feature indexes by using a sliding time window method according to the bus data to obtain a plurality of driving risk units;

step S2, writing a feature index codebook according to the driving risk characteristic feature indexes, and obtaining a word sequence of each driving risk unit according to the feature index codebook;

step S3, using a Latent Dirichlet Allocation (LDA) model to analyze a risk type of each driving risk unit according to the word sequence to evaluate a driving risk level.

In an embodiment, in step S1, the bus data in the vehicle driving process includes five driving behavior features, that is, a steering wheel angle, a steering wheel angle change rate, an accelerator pedal position, a brake pedal position and a brake pedal position change rate; each driving behavior feature has four driving risk characteristic feature indexes, that is, an average value of the driving behavior feature within a time window, a standard deviation of the driving behavior feature within the time window, a maximum value of the driving behavior feature within the time window, and a minimum value of the driving behavior feature within the time window.

In an embodiment, the extracting a driving risk characteristic feature indexes by using a sliding time window method according to the bus data includes: setting T1 as the sliding time window and T2 as a step size, extracting driving risk characteristic feature indexes of five driving behavior features under each time window by using the sliding time window method, and setting each time window as a driving risk unit to obtain a plurality of driving risk units, in which each driving risk unit includes 20 driving risk characteristic feature indexes.

In an embodiment, the writing a feature index codebook according to the driving risk characteristic feature indexes includes: dividing values of the driving risk characteristic feature indexes into several ranges, so that each range corresponds to a word; and obtaining the feature index codebook.

In an embodiment, the word sequence of the driving risk unit is expressed as:

$$d_m = [w_{m1}, w_{m2}, \ldots, w_{mn}]$$

where $d_m$ denotes a word sequence of an m-th driving risk unit, and $w_{mn}$ denotes an n-th word in the m-th driving risk unit.

In an embodiment, a method of training the Latent Dirichlet Allocation (LDA) model includes:

sampling all word sequences randomly to obtain a training set;

constructing the LDA model and setting an iteration number of the model;

setting a series of risk theme numbers k, and dividing word sequences of driving risk units into k risk themes;

for each risk theme number k, training the LDA model iteratively by using the training set to obtain perplexity and coherence score of the model corresponding to each risk theme number;

determining optimal risk theme number $k_m$ according to the perplexity and the coherence score.

In an embodiment, the risk level of each risk theme is determined by visually analyzing the driving risk characteristic feature indexes in each risk type for $k_m$ risk themes.

In an embodiment, the using a Latent Dirichlet Allocation (LDA) model to analyze a risk type of each driving risk unit according to the word sequence to evaluate a driving risk level includes: using a trained LDA model to analyze the risk theme of each driving risk unit according to the word sequence, and determining a corresponding risk level according to the risk theme.

A system for evaluating a driving risk level in a tunnel based on vehicle bus data, includes:

a data acquisition and analysis module, which is configured to acquire bus data in a vehicle driving process in a tunnel, and extract driving risk characteristic feature indexes by using a sliding time window method according to the bus data;

a feature index encoding module, which is configured to write a feature index codebook according to the driving risk characteristic feature indexes, and obtain a word sequence under each time window according to the feature index codebook;

a risk analysis and evaluation module, which is configured to use a Latent Dirichlet Allocation (LDA) model to analyze the word sequence to evaluate a driving risk level.

A computer device includes:

one or more processors;

a memory, in which one or more programs are stored;

where the one or more programs, when executed by the one or more processors, cause the one or more processors to implement the method for evaluating a driving risk level in a tunnel based on vehicle bus data described above.

A computer-readable storage medium storing computer instructions, where the computer instructions, when executed by one or more processors, cause the one or more processors to implement steps in the method described above.

The present disclosure has the following beneficial effects.

First, the risk evaluation index is specially designed according to the tunnel driving behavior, and 20 targeted indexes reflecting the driving risk level are put forward by using the original data of a plurality of driving behaviors that the Controller Area Network (CAN) bus data has.

Second, the present disclosure uses the LDA probability theme method to identify the driving risk level in the tunnel. Compared with the commonly used algorithms such as K-means and Fuzzy C-Means (FCM) clustering, the LDA algorithm can tap the potential semantic probability information of the driving behavior in the iterative process and acquire the driving risk theme that is more in line with the real driving scene.

Third, the present disclosure uses the codebook to encode the driving risk characteristic feature indexes, which is helpful to deepen the understanding of the driving risk behavior.

Fourth, the method proposed by the present disclosure can be applied to a super-large sample set because semantic segmentation and symbolization can be conveniently realized by the database, and the theme generation efficiency of the LDA is high. The method can be applied to high-dimensional sample sets. This is difficult to be achieved by the existing methods.

DETAILED DESCRIPTION OF THE EMBODIMENTS

Figure 1:
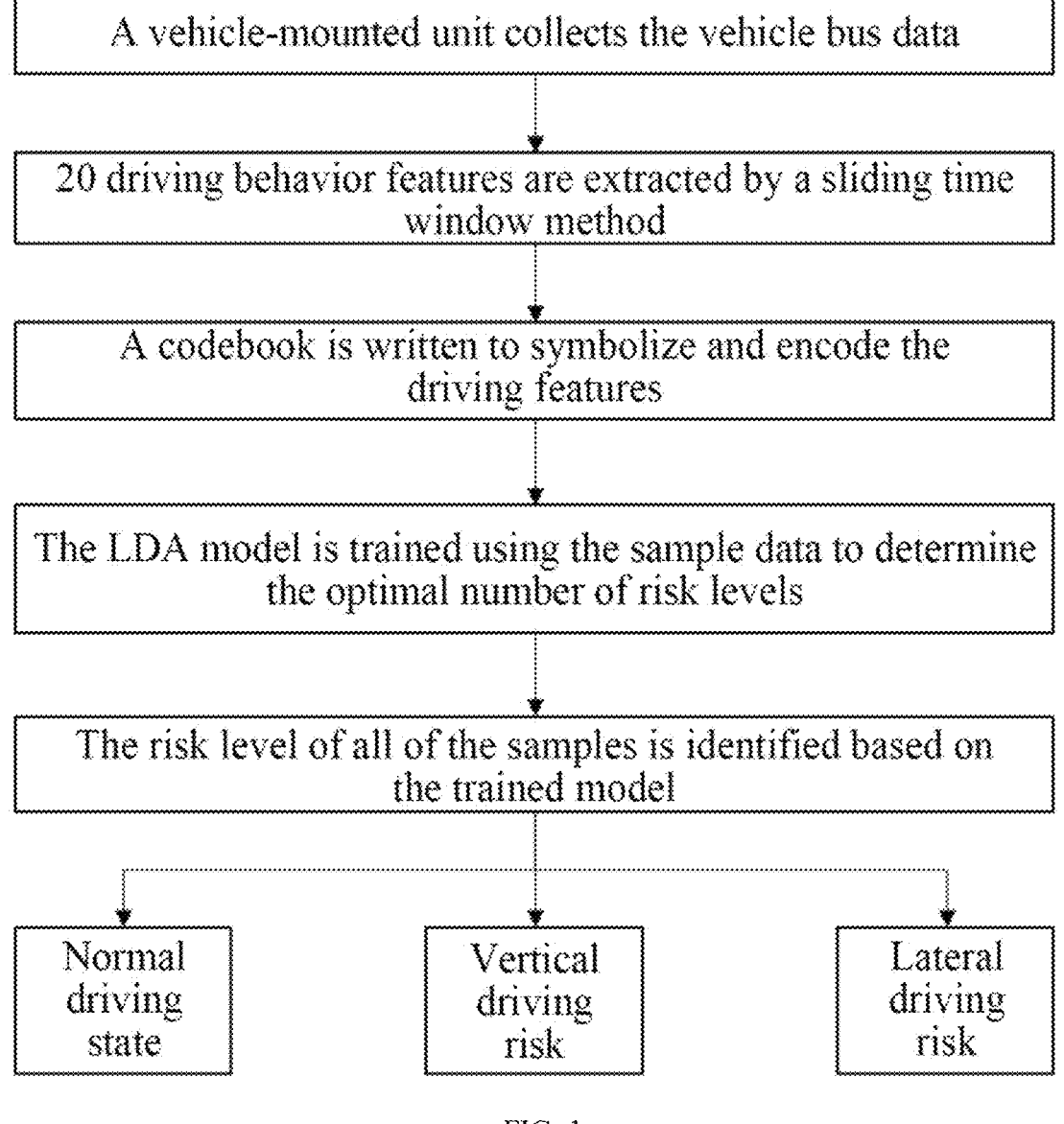
FIG. 1 is a flow chart of a method for evaluating a driving risk level in a tunnel based on vehicle bus data according to an embodiment of the present disclosure.

The technical scheme of the present disclosure will be further described clearly and in detail with reference to the attached drawings and the embodiments.

According to the present disclosure, the driving behavior data in the tunnel is collected by the vehicle bus. A total of 20 indexes reflecting the driving behavior features are designed and extracted by using a sliding time window method. Each index is encoded according to its distribution range through a feature codebook, and a feature index codebook is acquired. Thereafter, model training is carried out. T % of random sampling is carried out from all of the samples. Vehicles with driving risks are identified based on a Latent Dirichlet Allocation (LDA) model. The optimal number of risk levels is selected through the perplexity and the coherence score, and the risk identification is conducted on all of the samples. The method is helpful to accurately and intuitively identify the risk level of the vehicle driving state, and provides support for realizing risk management and active early warning of the vehicle.

Embodiment 1

A method for evaluating a driving risk level in a tunnel based on vehicle bus data, includes steps S1-S3.

In step S1, bus data in a vehicle driving process in a tunnel is acquired, and a driving risk characteristic feature index is extracted by using the sliding time window method according to the bus data to obtain a plurality of driving risk units.

In step S2, a feature index codebook is written according to the driving risk characteristic feature index, and a word sequence of each driving risk unit is obtained according to the feature index codebook.

In step S3, a Latent Dirichlet Allocation (LDA) model is used to analyze a risk type of the driving risk units according to the word sequence to evaluate a driving risk level.

In step S1, the bus data in the vehicle driving process includes five driving behavior features, that is, a steering wheel angle, a steering wheel angle change rate, an accelerator pedal position, a brake pedal position and a brake pedal position change rate. Each driving behavior feature has four driving risk characteristic feature indexes, that is, an average value of driving behavior features within a time window, a standard deviation of driving behavior features within the time window, a maximum value of driving behavior features within the time window, and a minimum value of driving behavior features within the time window.

The method for calculating the average value of driving behavior features within the time window is as follows:

$$Mean_{feature} = \frac{\sum\limits_{t=0}^{N_l} feature_t}{N_l}$$

where $Mean_{feature}$ denotes an average value of driving behavior features within the time window of a length $N_l$, the features include a steering wheel angle, a steering wheel angle change rate, an accelerator pedal position, a brake pedal position and a brake pedal position change rate.

The method for calculating the standard deviation of driving behavior features within the time window is as follows:

$$\sigma_{feature} = \sqrt{\frac{1}{N_l}\sum\limits_{t=0}^{N_l}(feature_t - Mean)^2}$$

where $\sigma_{feature}$ denotes the standard deviation of driving behavior features within the time window of the length $N_l$.

The method for calculating the maximum value of driving behavior features within the time window is as follows:

$$Max_{feature} = Max\left(feature_0, feature_1, ..., feature_{N_l}\right)$$

where $Max_{feature}$ denotes the maximum value of driving behavior features within feature the time window of the length $N_l$, and $feature_{N_l}$ denotes a feature value at the time $N_l$.

The method for calculating the minimum value of driving behavior features within the time window is as follows:

$$Min_{feature} = Min\left(feature_0, feature_1, ..., feature_{N_l}\right)$$

where $Min_{feature}$ denotes the minimum value of driving behavior features within the time window of the length $N_l$.

In step S1, extracting a driving risk characteristic feature index by using the sliding time window method according to the bus data specifically includes: with T1 as a sliding time window, T2 as a step size (T1 can be 0.5s, 1s, 1.5s, etc., and T2 can be equal to or more than 0.1s), extracting the driving risk characteristic feature index of five driving behavior features under each time window by using the sliding time window method, and setting each time window as a driving risk unit to obtain a plurality of driving risk units, in which each driving risk unit includes 20 driving risk characteristic feature indexes.

In step S2, writing a feature index codebook according to the driving risk characteristic feature index specifically includes: dividing the value of the driving risk characteristic feature index into several ranges, so that each range corresponds to a word; and obtaining the feature index codebook.

After the driving behavior data is divided and symbolized, 20 features of each risk unit correspond to 20 words, respectively. Each driving risk unit can be represented by a word sequence. The word sequence of the driving risk unit can be expressed as:

$$d_m = [w_{m1}, w_{m2}, ..., w_{mn}]$$

where $d_m$ denotes a word sequence of an m-th driving risk unit, and $w_{mn}$ denotes an n-th word in the m-th driving risk unit.

In Step S3, a method of training the Latent Dirichlet Allocation (LDA) model includes the steps S31-S35.

In step S31, all word sequences are sampled randomly to obtain a training set. Specifically, each word sequence is created as a document, and the collection of all documents forms a corpus. Samples accounting for T % (T usually takes the value of 20 to 40) of the corpus are randomly sampled in the corpus to obtain a small sample as a training set.

In step S32, the LDA model is constructed and the iteration number of the model is set (the value is 30 to 100).

In step S33, a series of risk theme numbers is set, k=2, 3, 4, . . . , 10, and the word sequences of the driving risk units are divided into k risk themes. The composition of the risk themes in each document and the composition of words in each risk theme can be described by Dirichlet-polynomial conjugate. Each parameter relation of the LDA model includes: $\theta_m \sim Dir(\theta; \alpha)$, $\phi_k \sim Dir(\phi; \beta)$, $z_{m,n} \sim Mult(z; \phi_{z_{m,n}})$, $w_{m,n} \sim Mult(w; \phi_{z_{m,n}})$, where k denotes the number of risk themes, m denotes an m-th driving risk unit, $\theta$, $\alpha$, $\beta$ and $\phi$ denote the parameters of the LDA model, z denotes a potential risk themes, $Dir(\bullet)$ denotes the number of Dirichlet distributions, $Mult(\bullet)$ denotes the polynomial distribution. The parameters of the LDA and its extension are solved by a variational Bayesian algorithm in this embodiment. For M documents in the corpus, the process of generating risk themes is independent of each other. Therefore, there are M independent conjugate structures. The LDA model as a whole is a joint probability distribution consisted of observed variables and hidden variables, which is expressed as follows:

$$p\left(w, z, \theta, \phi | \alpha, \beta\right) = \prod_{k=1}^{K} p\left(\phi_k | \beta\right) \prod_{m=1}^{M} p\left(\theta_m | \alpha\right) \prod_{n=1}^{N} p\left(z_{mn} | \theta_m\right) p\left(w_{mn} | z_{mn}, \phi\right)$$

where K denotes the number k of risk themes, and M denotes the number of driving risk units.

In step S34, for each risk theme number k, the LDA model is trained iteratively by using the training set to obtain the perplexity and the coherence score of the model corresponding to each risk theme number. The method for calculating the perplexity and the coherence score is as follows:

$$perplexity = e^{\frac{-\sum \log\left(p(w)\right)}{N}}$$

-continued $$\text{Coherence Score} = \frac{2}{N(N-1)} \sum_{i=2}^{N} \sum_{j=1}^{i-1} \log \frac{P(w_i, w_j) + \varepsilon}{P(w_j)}$$

where perplexity denotes the perplexity, Coherence Score denotes the coherence score, N denotes the total number of words, $P(w_i, w_j)$ denotes the number of appearances of the word $w_i$ and the word $w_j$ both in the document, $P(w_j)$ denotes the number of appearance of the word $w_j$ alone, and $\varepsilon$ denotes the compensation coefficient.

In step S35, the optimal number $k_m$ of risk themes is determined according to the perplexity and the consistency score.

The risk level of each risk theme is determined by visually analyzing the driving risk characteristic feature indexes in each risk type for $k_m$ risk themes.

Using a Latent Dirichlet Allocation (LDA) model to analyze a risk type of the driving risk units according to the word sequence to evaluate a driving risk level specifically includes: using the trained LDA model to analyze the risk theme of each driving risk unit according to the word sequence, and determining the corresponding risk level according to the risk theme.

Embodiment 2

Taking the CAN bus data of 30 drivers driving in a tunnel collected through a natural driving test as an example, the driving risk level is identified as follows.

1. Based on the CAN bus data, 20 driving risk characteristic feature indexes reflecting the driving risk level are extracted.

In order to facilitate the follow-up study, the frequency of all data is unified to 10 Hz by down sampling. Because the driving times of different drivers are different, the lengths of sequence data collected from different drivers are different. In order to alleviate these problems, the sliding time window method is used to extract the features of fixed windows. Therefore, the trajectory data is statistically described in each time window with a fixed time window length (such as the maximum value, the minimum value, the average value and the standard deviation), and a total of 20 indexes are obtained. Because risk driving behaviors of a driver are often sudden and transitory, in order to finely depict driving risks, T1=0.5s is selected as the moving window, which is denoted as the driving risk unit. The step size is T2=0.1s. Finally, 469,830 driving risk units are extracted from the CAN bus data of 30 drivers driving in a tunnel.

2. A feature codebook is designed and each index is encoded to obtain a feature text.

(1) The feature codebook is designed.

Figure 2:
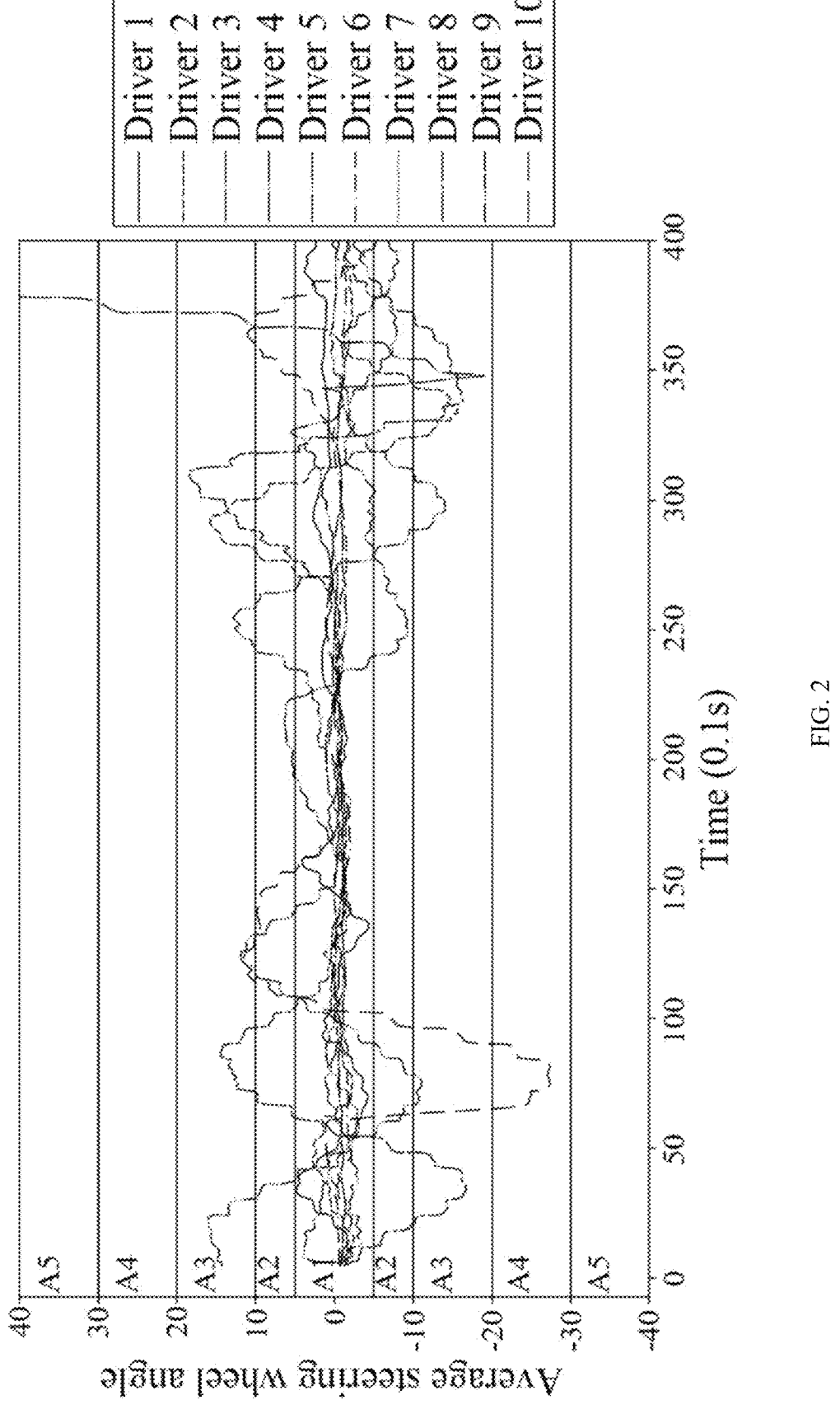
FIG. 2 is a schematic diagram of encoding an average steering wheel angle of 10 drivers according to an embodiment of the present disclosure.

Taking the average steering wheel angle as an example, since the steering wheel angle mainly fluctuates between 5 degrees and −5 degrees in the normal driving process of the driver, accounting for 95.23% (447,419/469,830), the sample feature in which the steering wheel angle falls within the range of [−5, 5] is denoted as A1 in this embodiment. Except A1, the average steering wheel angle is mainly distributed between 150 degrees and −150 degrees. In addition, a few average steering wheel angles are distributed outside the range. Therefore, the absolute values of the encoding range of the average steering wheel angles are: 0 to 5, 5 to 10, 10 to 20, 20 to 30, 30 to 40, 40 to 60, 60 to 120, 120 to 200, and the corresponding encoding words are: A1, A2, . . . , A8. Some encoding results are shown in FIG. 2. Each extracted feature of driver behavior data is encoded according to the data distribution and the domain knowledge. Taking the driving risk characteristic feature indexes extracted by the steering wheel angle, the steering wheel angle change rate and the accelerator pedal position as examples, the encoding results are shown in the following table:

| Primitive feature | Extracted index | Encoding result | | | | | | | | | | |
|---|---|---|---|---|---|---|---|---|---|---|---|---|
| Steering wheel angle (deg) | Average value | [0, 5) | [5, 10) | [10, 20) | [20, 30) | [30, 40) | [40, 60) | [60, 120) | [120 +∞) | | | |
| | | A1 | A2 | A3 | A4 | A5 | A6 | A7 | A8 | | | |
| | Standard deviation | [0, 2.5) | [2.5, 5) | [5, 10) | [10, 15) | [15, 20) | [20, 25) | [25, 30) | [30, 35) | [35, +∞) | | |
| | | B1 | B2 | B3 | B4 | B5 | B6 | B7 | B8 | B9 | | |
| | Maximum value | [0, 5) | [5, 10) | [10, 20) | [20, 30) | [30, 40) | [40, 60) | [60, 120) | [120 +∞) | | | |
| | | C1 | C2 | C3 | C4 | C5 | C6 | C7 | C8 | | | |
| | Minimum value | [0, 5) | [5, 10) | [10, 20) | [20, 30) | [30, 40) | [40, 60) | [60, 120) | [120 +∞) | | | |
| | | D1 | D2 | D3 | D4 | D5 | D6 | D7 | D8 | | | |
| Steering wheel angle change rate (deg/s) | Average value | [0, 5) | [5, 10) | [10, 30) | [30, 50) | [50, 70) | [70, 90) | [90, 120) | [120, +∞) | | | |
| | | E1 | E2 | E3 | E4 | E5 | E6 | E7 | E8 | | | |
| | Standard deviation | [0, 2.5) | [2.5, 5) | [5, 10) | [10, 15) | [15, 20) | [20, 25) | [25, 30) | [30, 35) | [35, 40) | [40, 50) | [50, +∞) |
| | | F1 | F2 | F3 | F4 | F5 | F6 | F7 | F8 | F9 | F10 | F11 |
| | Maximum value | [0, 5) | [5, 10) | [10, 30) | [30, 50) | [50, 70) | [70, 90) | [90, 120) | [120, +∞) | | | |
| | | G1 | G2 | G3 | G4 | G5 | G6 | G7 | G8 | | | |
| | Minimum value | [0, 5) | [5, 10) | [10, 30) | [30, 50) | [50, 70) | [70, 90) | [90, 120) | [120, +∞) | | | |
| | | H1 | H2 | H3 | H4 | H5 | H6 | H7 | H8 | | | |

-continued

| Primitive feature | Extracted index | Encoding result | | | | | | | | | | |
|---|---|---|---|---|---|---|---|---|---|---|---|---|
| Accelerator pedal position (%) | Average value | [0, 5) | [5, 10) | [10, 20) | [20, 30) | [30, 40) | [40, 50) | [50, 60) | [60, 70) | [70, 80) | [80, 90) | [90, +∞) |
| | | I1 | I2 | I3 | I4 | I5 | I6 | I7 | I8 | I9 | I10 | I11 |
| | Standard deviation | [0, 2.5) | [2.5, 5) | [5, 10) | [10, 15) | [15, 20) | [20, 25) | [25, 30) | [30, 35) | [35, 40) | [40, +∞) | |
| | | J1 | J2 | J3 | J4 | J5 | J6 | J7 | J8 | J9 | J10 | |
| | Maximum value | [0, 5) | [5, 10) | [10, 20) | [20, 30) | [30, 40) | [40, 50) | [50, 60) | [60, 70) | [70, 80) | [80, 90) | [90, +∞) |
| | | K1 | K2 | K3 | K4 | K5 | K6 | K7 | K8 | K9 | K10 | K11 |
| | Minimum value | [0, 5) | [5, 10) | [10, 20) | [20, 30) | [30, 40) | [40, 50) | [50, 60) | [60, 70) | [70, 80) | [80, 90) | [90, +∞) |
| | | L1 | L2 | L3 | L4 | L5 | L6 | L7 | L8 | L9 | L10 | L11 |

(2) The word sequence of the driving risk unit is acquired.

After the driving behavior data is divided and symbolized, 20 driving risk characteristic feature indexes of each risk unit correspond to 20 words, respectively. Each driving risk unit can be represented by a word sequence, such as "A1, B2, C5, D8, E2, . . . , T1", which is a document: $d_m = w_m = [w_{m1}, w_{m2}, \ldots, w_{mn}]$. All documents form a corpus: $W = [w_1, w_2, \ldots, w_m]$, where W denotes a corpus, $d_m$ denotes a word sequence of an m-th risk unit, $w_m$ denotes an m-th document, and $w_{mn}$ denotes an n-th word in the m-th driving risk unit, that is, the an n-th word in the m-th document.

3. The LDA model is used to identify the driving risk.

(1) The optimal number $k_m$ of risk themes is determined.

Figure 3:
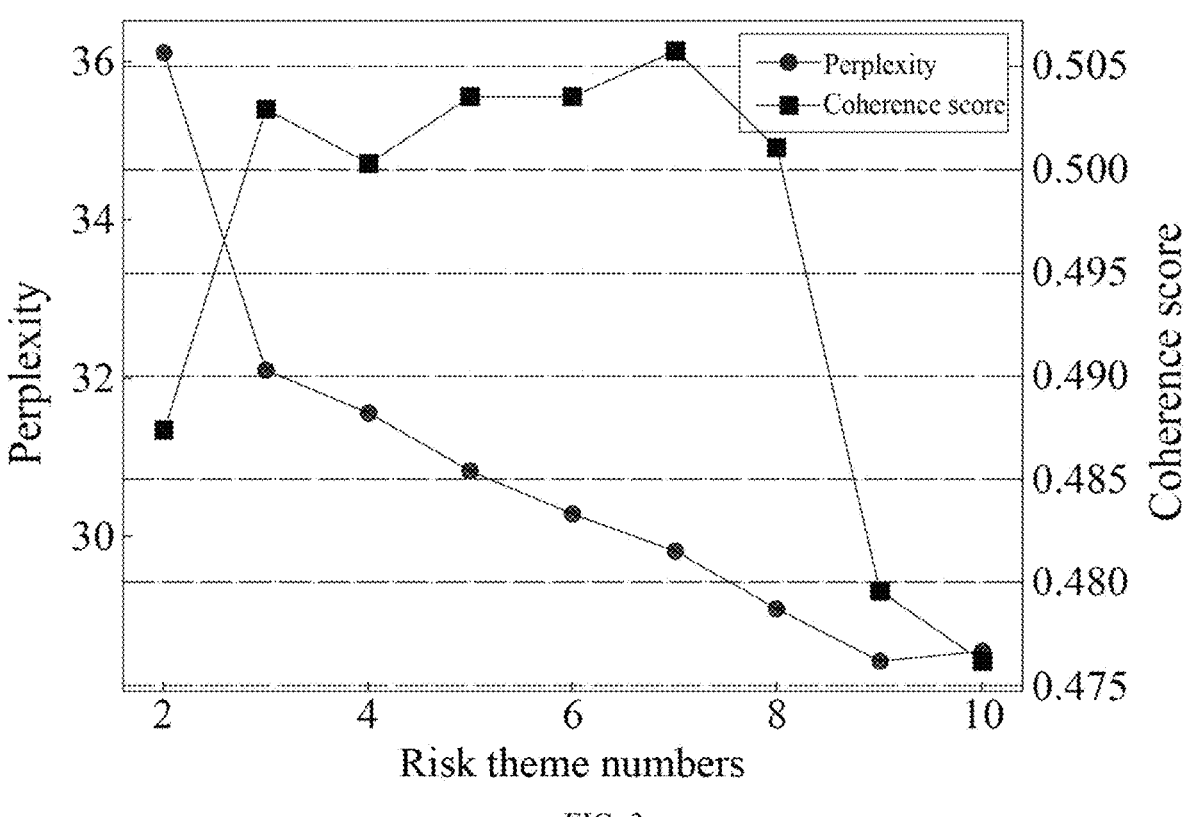
FIG. 3 is a schematic diagram of selecting the optimal number of risk themes according to an embodiment of the present disclosure.
Figure 4A:
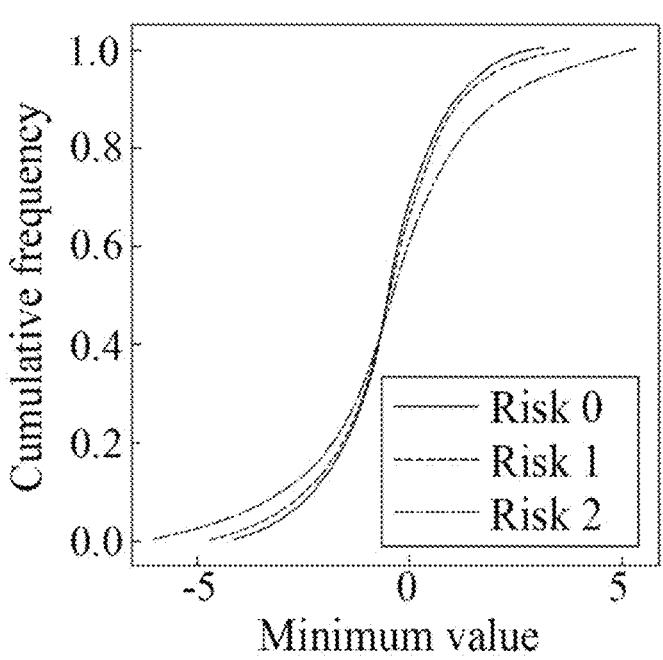
FIGS. 4A-4D are schematic diagrams of distribution of steering wheel angles at various risk levels according to an embodiment of the present disclosure.
Figure 4B:
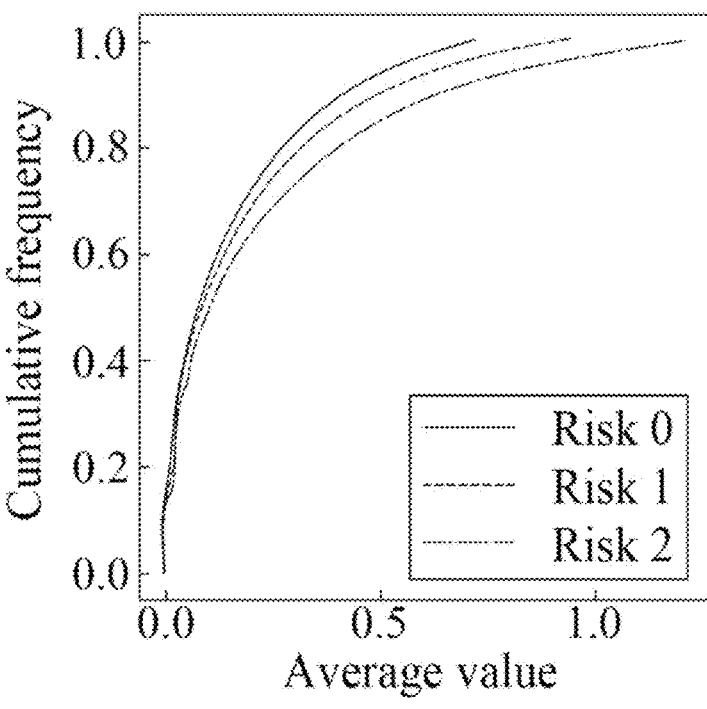
Figure 4C:
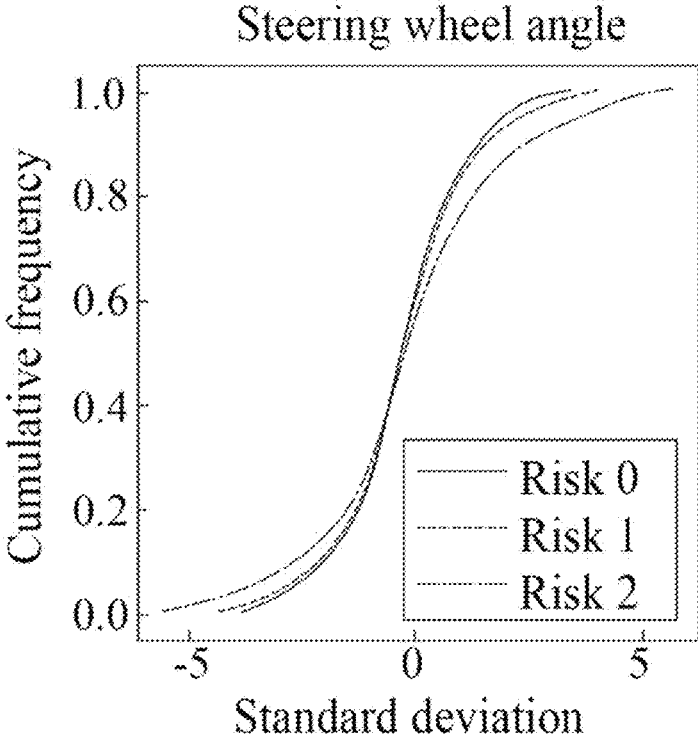
Figure 4D:
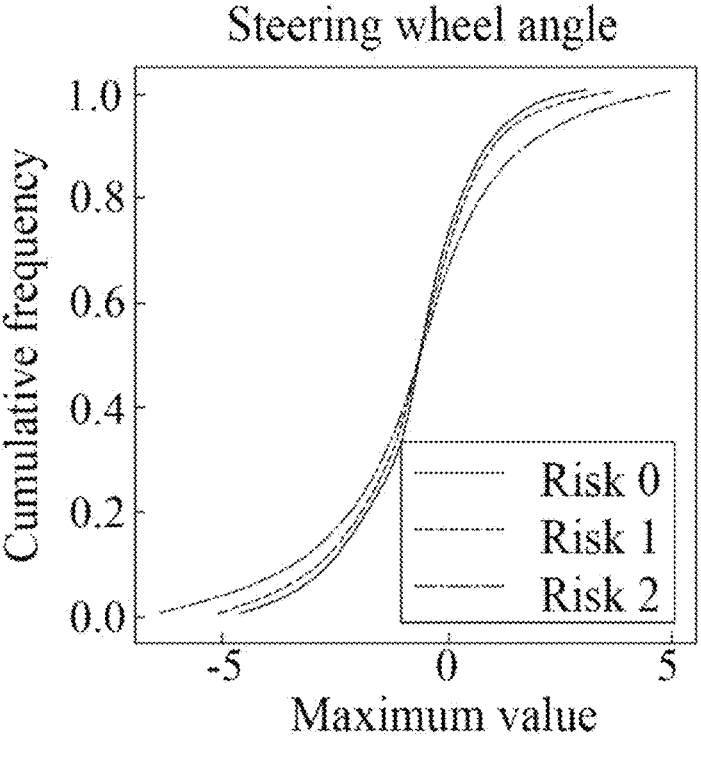
Figure 5A:
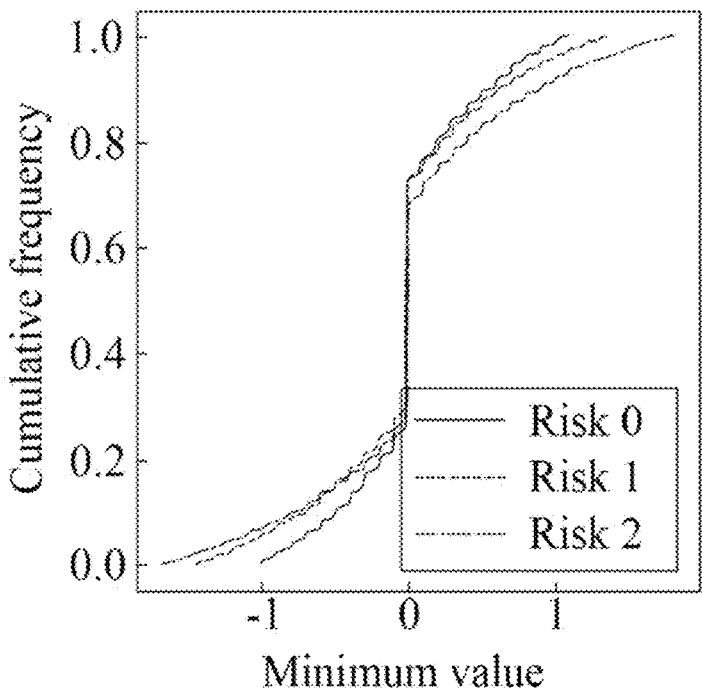
FIGS. 5A-5D are schematic diagrams of distribution of steering wheel angle change rates under various risk themes according to an embodiment of the present disclosure.
Figure 5B:
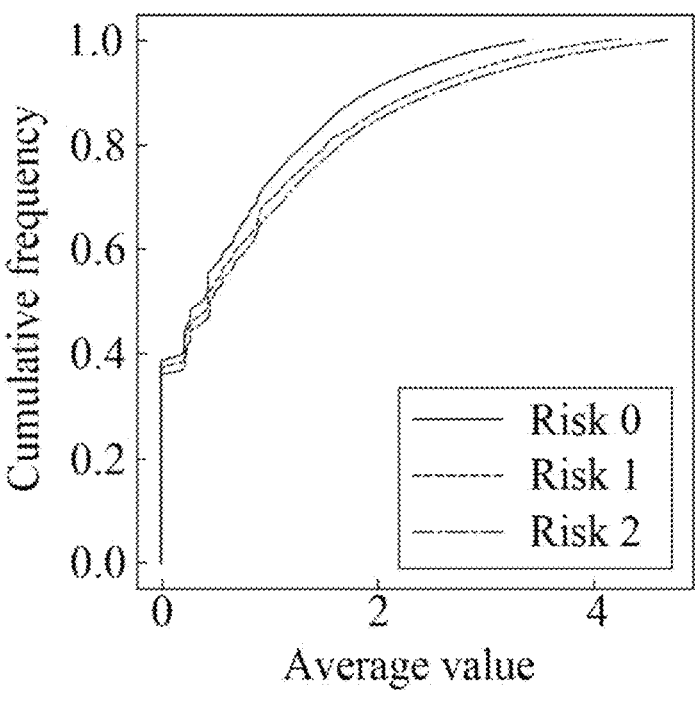
Figure 5C:
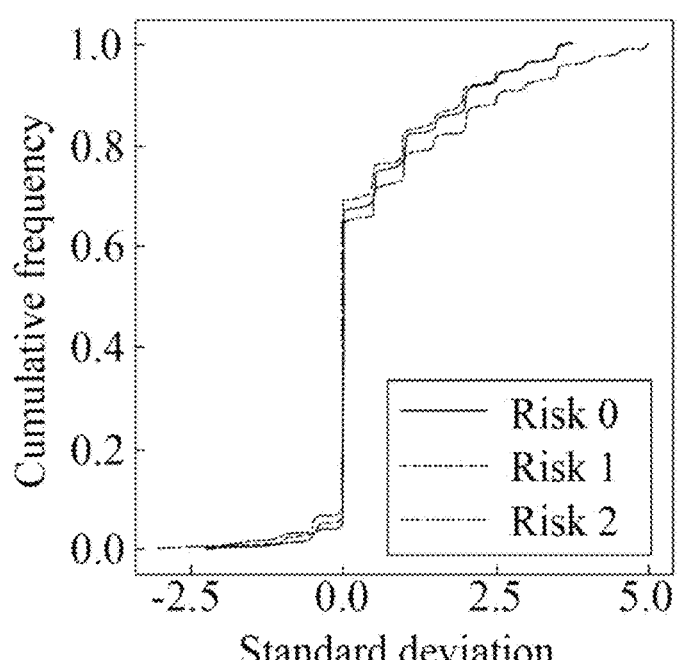
Figure 5D:
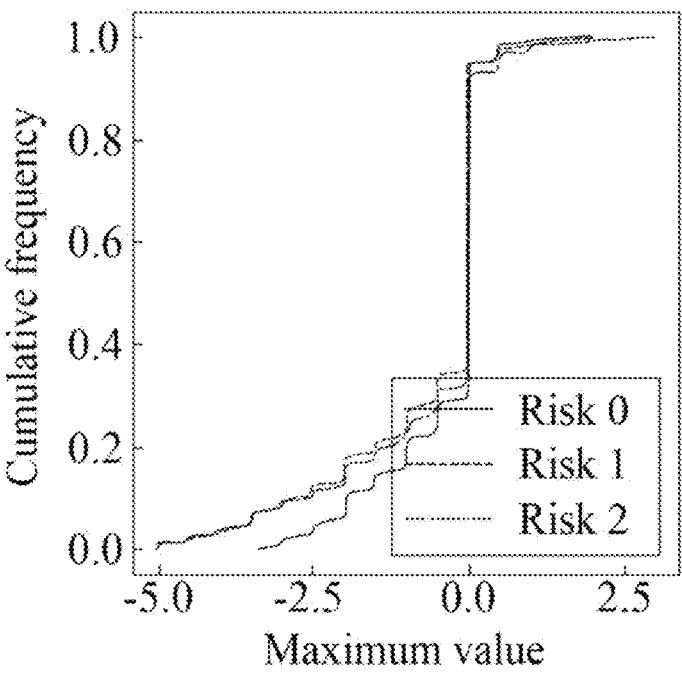
Figure 6A:
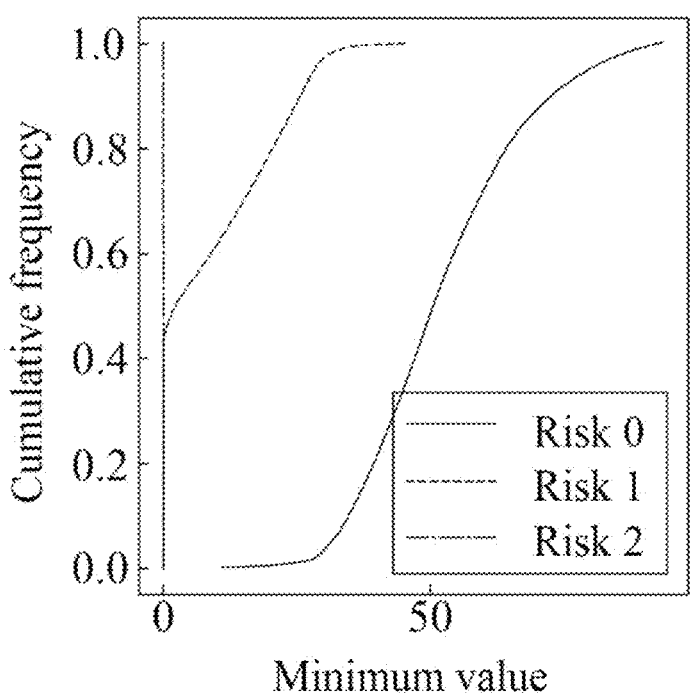
FIGS. 6A-6D are schematic diagrams of distribution of accelerator pedal position under various risk themes according to an embodiment of the present disclosure.
Figure 6B:
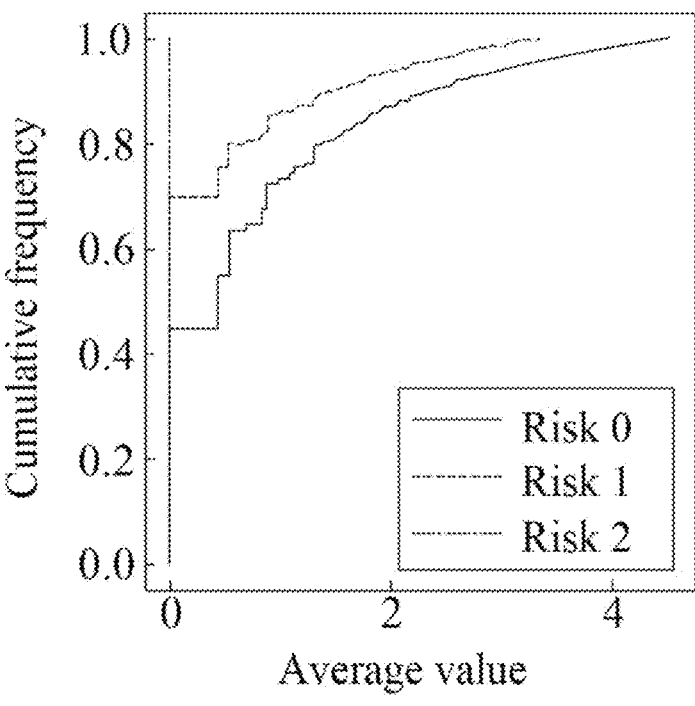
Figure 6C:
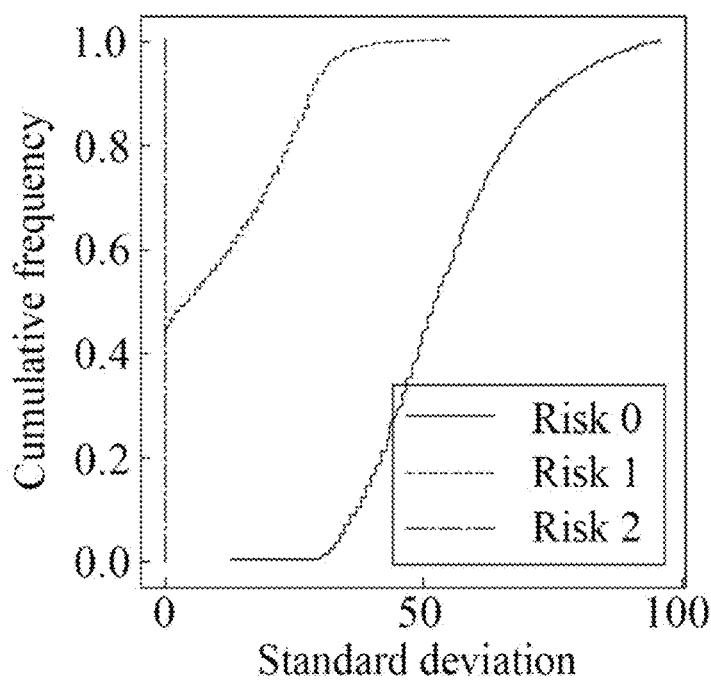
Figure 6D:
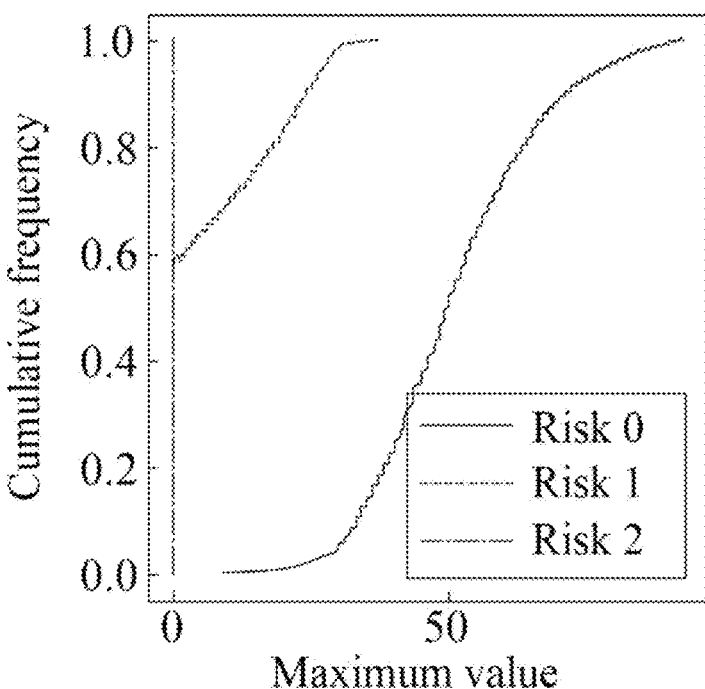
Figure 7A:
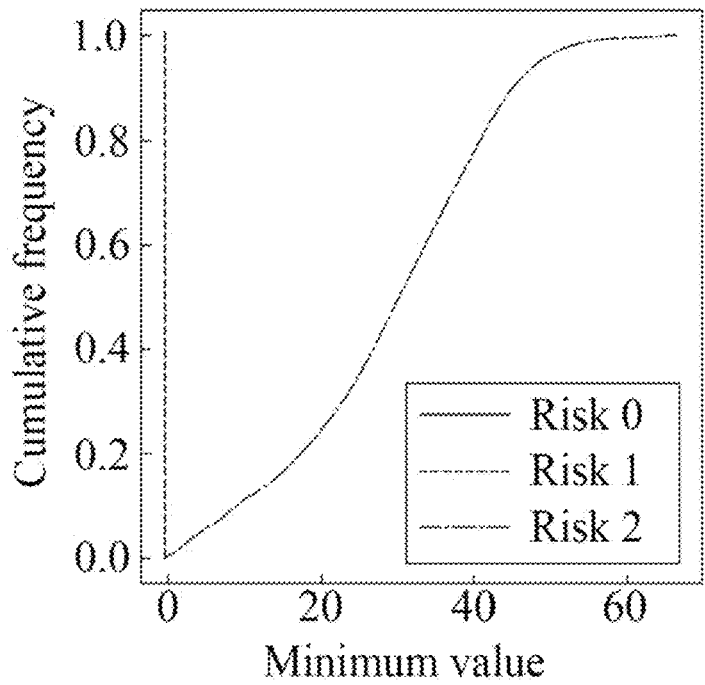
FIGS. 7A-7D are schematic diagrams of distribution of brake pedal position under various risk themes according to an embodiment of the present disclosure.
Figure 7B:
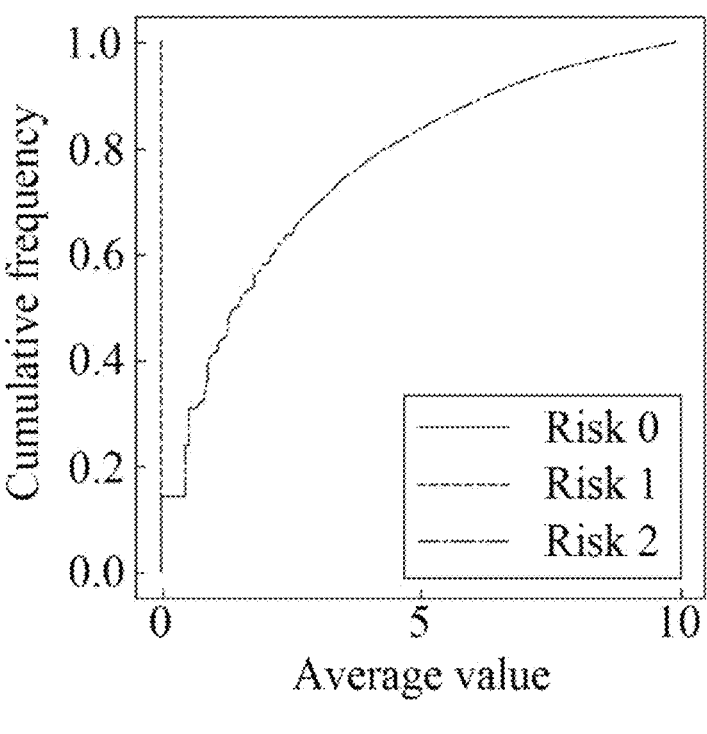
Figure 7C:
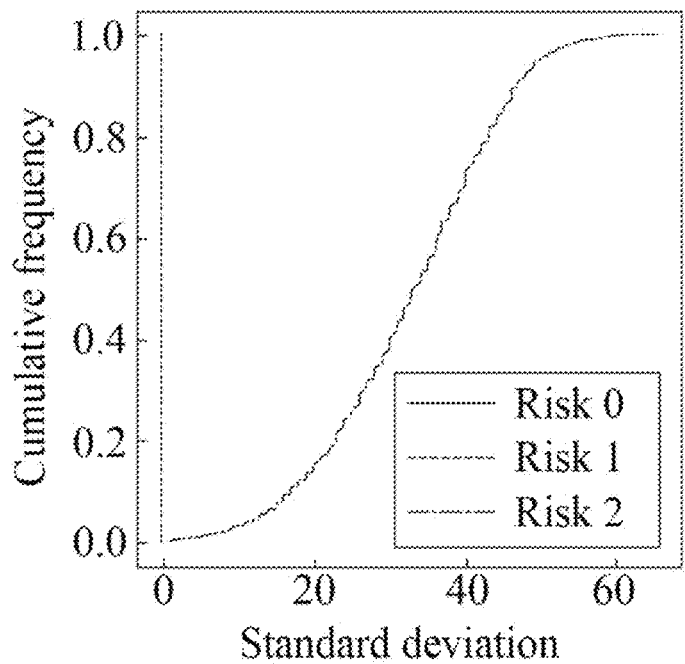
Figure 7D:
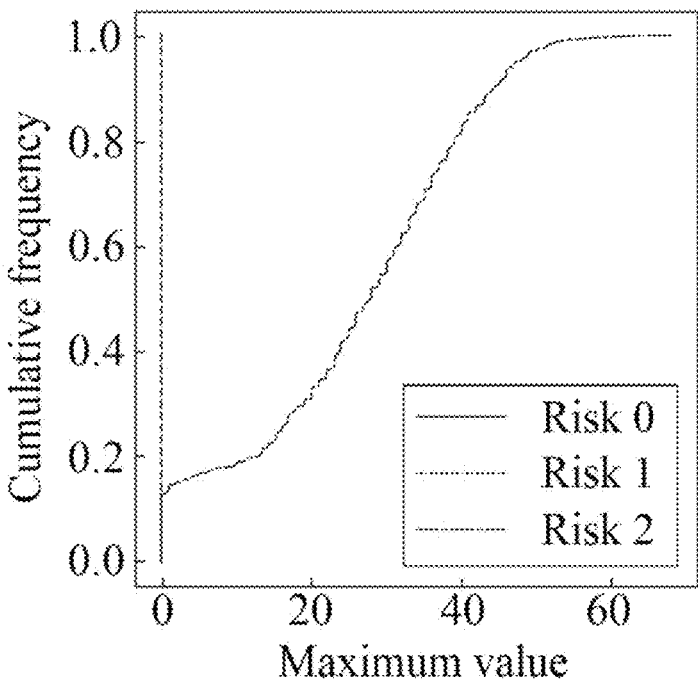
Figure 8A:
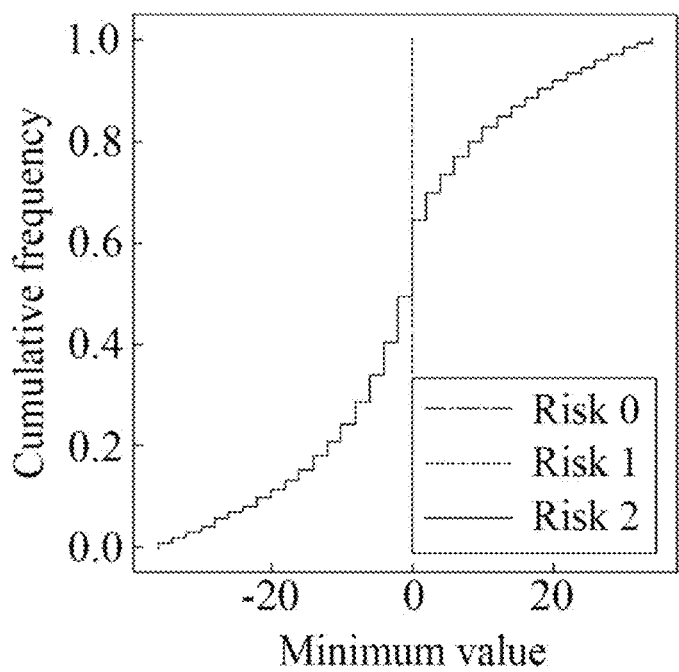
FIGS. 8A-8D are schematic diagrams of distribution of brake pedal position change rates under various risk themes according to an embodiment of the present disclosure.
Figure 8B:
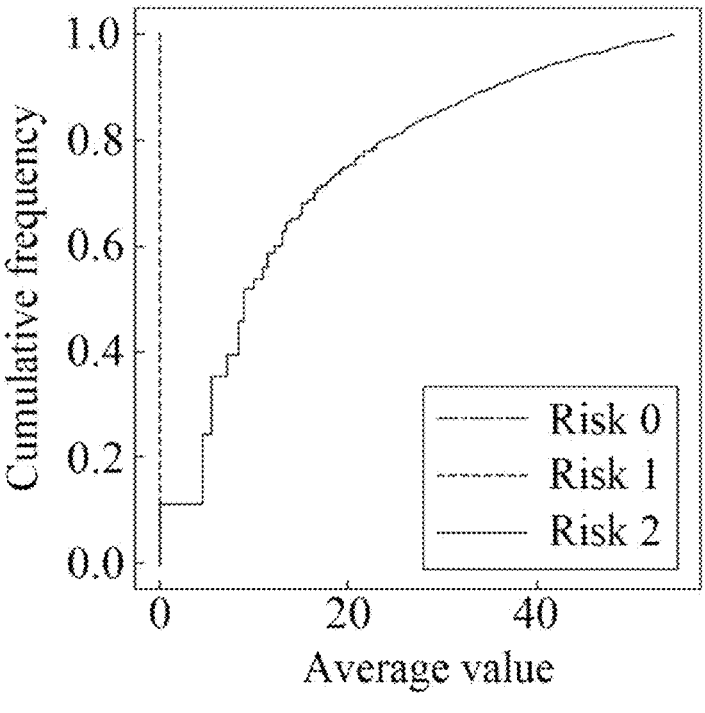
Figure 8C:
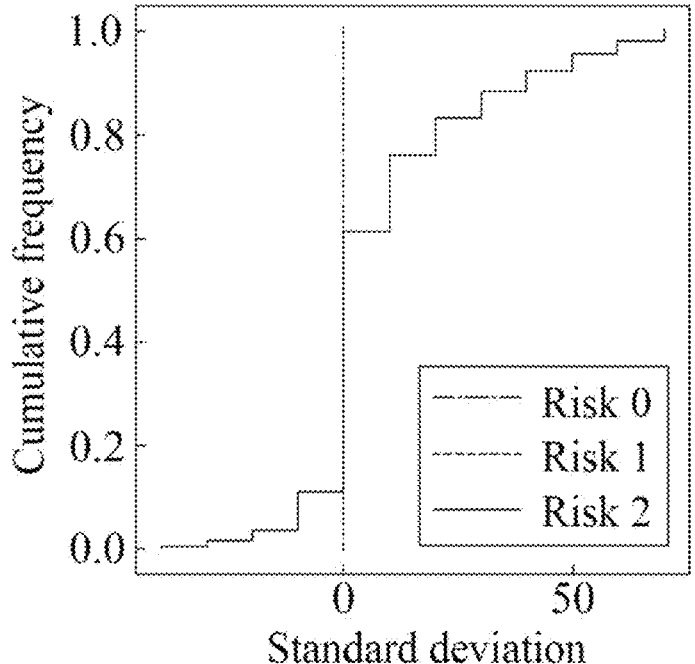
Figure 8D:
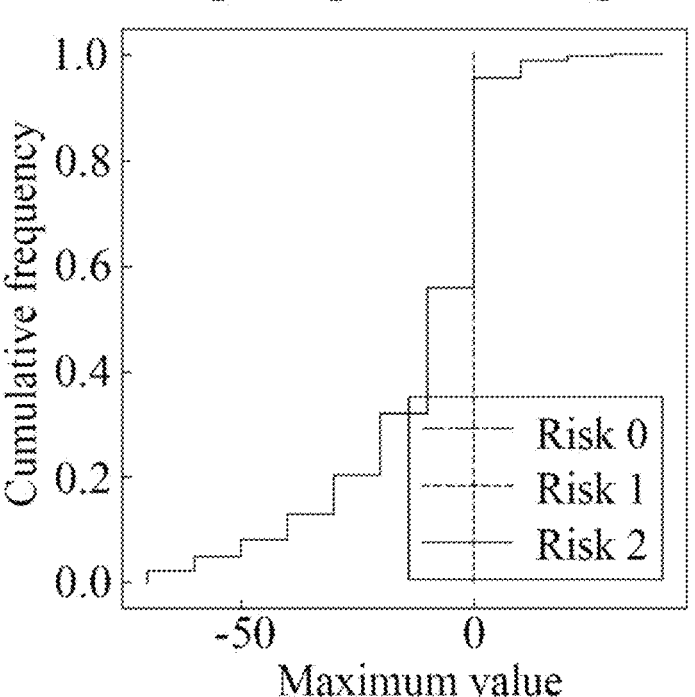

Small samples accounting for 30% of all of the samples are extracted to determine the optimal number of risk themes. A series of risk theme numbers is set, k=2, 3, 4, . . . , 10. The model is trained iteratively for each k. The perplexity and the coherence score after each training are acquired. Finally, the distribution of evaluation indexes is drawn as shown in FIG. 3. Through the analysis of evaluation indexes, it is finally determined that the optimal number of risk themes is k=3 and the iteration number is 30.

(2) The driving risk level is identified.

The cumulative frequency distribution of each driving risk characteristic feature index under each risk theme is shown in FIG. 4A to FIG. 8D. By comparing the three risk levels of 0, 1 and 2, it can be known that the LDA model can explore the potential relationship between different driving behaviors. The risk level 0 represents the normal driving of a driver without great steering wheel rotation and braking behaviors, and the risk level is the minimum. In the risk level 1, the brake pedal position and its change rate are significantly higher, which represents that the driver takes sudden braking behaviors at this time and indicates a high vertical risk. In the risk level 2, the accelerator pedal position of the driver is high, and the steering wheel angle and its change rate are significantly increased. At this time, sudden lane changes or steering maneuvers by the driver may indicate a high lateral risk. Combined with the video data collected by the front camera, it is further known through manual discrimination that the driving environment of the driver in the risk levels 1 and 2 is more complicated, such as sudden braking of a preceding vehicle or abrupt lane intrusion by adjacent vehicles.

4. Full-sample risk identification is performed based on the optimal number of risk themes.

Based on the acquired optimal number of risk themes, sequence data dividing and symbolizing is performed on all samples in a relational database, and the risk is identified by the LDA model. The results show that there are 360,767 normal driving samples, 85,377 vertical risk samples and 23,686 lateral risk samples.

It should be understood by those skilled in the art that the embodiments of the present disclosure can be provided as a method, a system or a computer program product. Therefore, the present disclosure can take the form of an entirely hardware embodiment, an entirely software embodiment or an embodiment combining software and hardware aspects. Furthermore, the present disclosure may take the form of a computer program product implemented on one or more computer usable storage media (including but not limited to a disk storage, a CD-ROM, an optical storage, etc.) in which computer usable program codes are included.

The present disclosure is described with reference to flow charts and/or block diagrams of methods, devices (systems) and computer program products according to embodiments of the present disclosure. It should be understood that each flow and/or block in the flow chart and/or block diagram and combinations of the flow and/or block in the flow chart and/or block diagram can be implemented by computer program instructions. These computer program instructions may be provided to a processor of a general-purpose computer, a special-purpose computer, an embedded processor or other programmable data processing devices to produce a machine, such that the instructions which are executed by the processor of the computer or other programmable data processing devices produce means for implementing the functions specified in one or more flow in the flow chart and/or one or more blocks in the block diagram.

These computer program instructions may also be stored in a computer-readable memory that can direct a computer or other programmable data processing devices to function in a particular manner, such that the instructions stored in the computer-readable memory produce an article of manufacture including instruction means that implement the functions specified in one or more flow in the flow chart and/or one or more blocks in the block diagram.

These computer program instructions may also be loaded onto a computer or other programmable data processing devices, such that a series of operational steps are executed on the computer or other programmable devices to produce a computer-implemented process, such that the instructions executed on the computer or other programmable devices provide steps for implementing the functions specified in one or more flow in the flow chart and/or one or more blocks in the block diagram.

The above is only the preferred embodiment of the present disclosure. Although the present disclosure has been disclosed in the above with preferred embodiments, it is not

11 | 12 intended to limit the present disclosure. Those skilled in the art can make many possible changes and modifications to the technical scheme of the present disclosure by using the methods and technical contents disclosed above, or modify the technical scheme into equivalent embodiments with equivalent changes without departing from the scope of the technical scheme of the present disclosure. Therefore, any simple modification, equivalent change and modification made to the above embodiment according to the technical essence of the present disclosure without departing from the content of the technical scheme of the present disclosure still fall within the scope of protection of the technical scheme of the present disclosure.

The invention claimed is:

1. A method for evaluating a driving risk level in a tunnel based on vehicle bus data, comprising:

step S1, acquiring bus data in a vehicle driving process in the tunnel, and extracting driving risk characteristic feature indexes by using a sliding window method according to the bus data to obtain a plurality of driving risk units;

step S2, writing a feature index codebook according to the driving risk characteristic feature indexes, and obtaining a word sequence of each driving risk unit according to the feature index codebook; and step S3, using a Latent Dirichlet Allocation (LDA) model to analyze a risk type of each driving risk unit according to the word sequence to evaluate the driving risk level, wherein the driving risk level comprises normal driving, lateral risks, vertical risks;

in response to the driving risk level of vertical risks, determining, by an advanced driving assistance system mounted in a current vehicle and in communication with the LDA model, that there is no situation of sudden braking of a preceding vehicle or abrupt lane intrusion by adjacent vehicles according to video data collected by a front camera of the current vehicle, outputting, by the advanced driving assistance system, a warning message to remind a driver of the current vehicle;

in response to the driving risk level of lateral risks, determining, by the advanced driving assistance system, that there is no need for lanes change or steering maneuvers according to the video data collected by the front camera of the current vehicle, outputting, by the advanced driving assistance system, the warning message to remind the driver of the current vehicle;

wherein in step S1, the bus data in the vehicle driving process comprises five driving behavior features of a steering wheel angle, a steering wheel angle change rate, an accelerator pedal position, a brake pedal position and a brake pedal change rate; each driving behavior feature has four driving risk characteristic feature indexes of an average value of the driving behavior feature within a time window, a standard deviation of the driving behavior feature within the time window, a maximum value of the driving behavior feature within the time window, and a minimum value of the driving behavior feature within the time window; and the step of writing the feature index codebook according to the driving risk characteristic feature indexes comprises: dividing values of the driving risk characteristic feature indexes into several ranges, so that each range corresponds to a word, which means encoding each driving risk characteristic feature index according to data distribution and domain knowledge to obtain the feature index codebook, wherein 20 driving risk characteristic feature indexes of each driving risk unit correspond to 20 words, respectively, and each driving risk unit is represented by a word sequence:

$$d_m = [w_{m1}, w_{m2}, \ldots, w_{mn}]$$

wherein $d_m$ denotes a word sequence of an m-th risk unit, and $W_{mn}$ denotes an n-th word in the m-th risk unit.

2. The method for evaluating the driving risk level in the tunnel based on the vehicle bus data according to claim 1, wherein the step of extracting the driving risk characteristic feature indexes by using the sliding window method according to the bus data comprises: with T1 as a sliding time window, and T2 as a step size, extracting driving risk characteristic feature indexes of the five driving behavior features under each time window by using the sliding window method, and setting each time window as a driving risk unit to obtain the plurality of driving risk units, wherein each driving risk unit of the plurality of driving risk units comprises the 20 driving risk characteristic feature indexes.

3. The method for evaluating the driving risk level in the tunnel based on the vehicle bus data according to claim 1, wherein a method of training the LDA model comprises:

sampling all word sequences randomly to obtain a training set;

constructing the LDA model and setting a number of model iterations;

setting a series of risk theme numbers k, and dividing word sequences of driving risk units into k risk themes;

for each risk theme number k, training the LDA model iteratively by using the training set to obtain a perplexity and a coherence score of a model corresponding to each risk theme number; and determining an optimal risk theme number $k_m$ of according to the perplexity and the coherence score.

4. The method for evaluating the driving risk level in the tunnel based on the vehicle bus data according to claim 3, wherein the risk level of each risk theme is determined by visually analyzing the driving risk characteristic feature indexes in each theme for $k_m$ risk themes.

5. A system for evaluating a driving risk level in a tunnel based on vehicle bus data, comprising:

a data acquisition and analysis module, wherein the data acquisition and analysis module is configured to acquire bus data in a vehicle driving process in the tunnel, and extract driving risk characteristic feature indexes by using a sliding window method according to the bus data; wherein the bus data in the vehicle driving process comprises five driving behavior features of a steering wheel angle, a steering wheel angle change rate, an accelerator pedal position, a brake pedal position and a brake pedal change rate; each driving behavior feature has four driving risk characteristic feature indexes of an average value of the driving behavior feature within a time window, a standard deviation of the driving behavior feature within the time window, a maximum value of the driving behavior feature within the time window, and a minimum value of the driving behavior feature within the time window;

a feature index encoding module, wherein the feature index encoding module is configured to write a feature index codebook according to the driving risk characteristic feature indexes, and obtain a word sequence under each time window according to the feature index codebook, which comprises: dividing values of the driving risk characteristic feature indexes into several ranges, so that each range corresponds to a word, which means encoding each driving risk characteristic feature index according to data distribution and domain knowledge to obtain the feature index codebook, wherein 20 driving risk characteristic feature indexes of each driving risk unit correspond to 20 words, respectively, and each driving risk unit is represented by a word sequence:

$$d_m = [w_{m1}, w_{m2}, \ldots, w_{mn}],$$

wherein $d_m$ denotes a word sequence of an m-th risk unit, and $W_{mn}$ denotes an n-th word in the m-th risk unit; and a risk analysis and evaluation module, wherein the risk analysis and evaluation module is configured to use a Latent Dirichlet Allocation (LDA) model to analyze a risk type of each driving risk unit according to the word sequence to evaluate the driving risk level; wherein the driving risk level comprises normal driving, lateral risks, vertical risks;

an advanced driving assistance system mounted in a current vehicle and in communication with the LDA model is configured for, in response to the driving risk level of vertical risks, determining that there is no situation of sudden braking of a preceding vehicle or abrupt lane intrusion by adjacent vehicles according to video data collected by a front camera of the current vehicle, outputting a warning message to remind a driver of the current vehicle; and, in response to the driving risk level of lateral risks, determining that there is no need for lanes change or steering maneuvers according to the video data collected by the front camera of the current vehicle, outputting the warning message to remind the driver of the current vehicle.

6. A computer device, comprising:

one or more processors;

a memory, wherein one or more programs are stored in the memory;

wherein the one or more programs, when executed by the one or more processors, allow the one or more processors to implement the method for evaluating the driving risk level in the tunnel based on the vehicle bus data according to claim 1.

7. The computer device according to claim 6, wherein the step of extracting the driving risk characteristic feature indexes by using the sliding window method according to the bus data comprises: with T1 as a sliding time window, and T2 as a step size, extracting driving risk characteristic feature indexes of the five driving behavior features under each time window by using the sliding window method, and setting each time window as a driving risk unit to obtain the plurality of driving risk units, wherein each driving risk unit of the plurality of driving risk units comprises the 20 driving risk characteristic feature indexes.

8. The computer device according to claim 6, wherein a method of training the LDA model comprises:

sampling all word sequences randomly to obtain a training set;

constructing the LDA model and setting a number of model iterations;

setting a series of risk theme numbers k, and dividing word sequences of driving risk units into k risk themes;

for each risk theme number k, training the LDA model iteratively by using the training set to obtain a perplexity and a coherence score of a model corresponding to each risk theme number; and determining an optimal risk theme number $k_m$ of according to the perplexity and the coherence score.

9. The computer device according to claim 8, wherein the risk level of each risk theme is determined by visually analyzing the driving risk characteristic feature indexes in each theme for $k_m$ risk themes.

10. A computer-readable storage medium storing computer instructions, wherein the computer instructions, when executed by one or more processors, allow the one or more processors to implement steps of the method for evaluating the driving risk level in the tunnel based on the vehicle bus data according to claim 1.

11. The computer-readable storage medium according to claim 10, wherein the step of extracting the driving risk characteristic feature indexes by using the sliding window method according to the bus data comprises: with T1 as a sliding time window, and T2 as a step size, extracting driving risk characteristic feature indexes of the five driving behavior features under each time window by using the sliding window method, and setting each time window as a driving risk unit to obtain the plurality of driving risk units, wherein each driving risk unit of the plurality of driving risk units comprises the 20 driving risk characteristic feature indexes.

12. The computer-readable storage medium according to claim 10, wherein a method of training the LDA model comprises:

sampling all word sequences randomly to obtain a training set;

constructing the LDA model and setting a number of model iterations;

setting a series of risk theme numbers k, and dividing word sequences of driving risk units into k risk themes;

for each risk theme number k, training the LDA model iteratively by using the training set to obtain a perplexity and a coherence score of a model corresponding to each risk theme number; and determining an optimal risk theme number $k_m$ of according to the perplexity and the coherence score.

13. The computer-readable storage medium according to claim 12, wherein the risk level of each risk theme is determined by visually analyzing the driving risk characteristic feature indexes in each theme for $k_m$ risk themes.

* * * * *